United States Patent [19]

Graetz et al.

[11] 4,125,677

[45] Nov. 14, 1978

[54] LEVELLING CONTROL OF POLAR LIQUIDS

[75] Inventors: Clive W. Graetz, Slough, England; Bruce Leary, Frankston, Australia

[73] Assignee: Dulux Australia Ltd., Victoria, Australia

[21] Appl. No.: 792,112

[22] Filed: Apr. 29, 1977

[30] Foreign Application Priority Data

May 3, 1976 [AU] Australia ............................ PC5775

[51] Int. Cl.$^2$ ............................................ B32B 27/30
[52] U.S. Cl. ...................................... 428/500; 106/316; 260/29.2 R; 260/885; 427/385 R; 428/463; 428/522; 526/320
[58] Field of Search ................... 427/385 R; 106/316; 428/500, 463, 522; 260/29.2 R, 885; 526/11.2, 320

[56] References Cited

U.S. PATENT DOCUMENTS

| 2,884,339 | 4/1959 | Dannenberg | 427/385 R |
|---|---|---|---|
| 3,244,655 | 4/1966 | Sullivan et al. | 260/885 |
| 3,661,827 | 5/1972 | Taft | 526/320 |
| 3,719,647 | 3/1973 | Hardy et al. | 526/320 |
| 4,002,703 | 1/1977 | Fahrbach et al. | 260/885 |
| 4,008,202 | 2/1977 | Evani et al. | 526/320 |

FOREIGN PATENT DOCUMENTS

| 1,167,524 | 10/1969 | United Kingdom | 526/320 |
|---|---|---|---|
| 1,345,907 | 2/1974 | United Kingdom. | |
| 1,371,755 | 10/1974 | United Kingdom. | |

Primary Examiner—William A. Powell
Assistant Examiner—J. J. Gallagher
Attorney, Agent, or Firm—Cushman, Darby & Cushman

[57] ABSTRACT

A process of modifying the levelling characteristics of a film of a polar liquid coating composition by incorporating therein 0.5–60% by weight of an amphipathic random copolymer which comprises 5–50% of a monomer which has a chain-like structure at least 80 covalent bonds long and which is soluble in poly(ethylene oxide) of molecular weight 400, and 25–95% of a (meth)acrylate monomer which comprises a chain-like moiety of at least 10 covalent atoms long and which is not soluble in poly(ethylene oxide) of molecular weight 400. The resulting copolymer may be added to polar liquid coating compositions to give useful improvements in flow and levelling characteristics.

10 Claims, No Drawings

LEVELLING CONTROL OF POLAR LIQUIDS

This invention relates to the levelling characteristics of films of liquid polar coating compositions on solid substrates and to the control thereof.

One fundamental property normally looked for in a liquid coating which has been applied to a solid substrate, is that the coating shall flow out to a film which is generally level and of uniform thickness and spread over the entire surface of substrate presented to it. In particular, it is often required that this levelling process shall continue until gross irregularities in the film caused by the method of application, for example brush marks and a mottled spray pattern, have been eliminated or reduced to an acceptable level.

In practice, it is usually not difficult to provide sufficient mobility in a liquid coating to ensure the degree of levelling necessary to eradicate such types of film irregularities, but there is always the danger that excessive mobility will lead to sagging of the liquid film on non-horizontal surfaces. Thus, a delicate balance must be struck between the extremes of inadequate and excessive flow if satisfactory levelling is to be achieved.

It is also important that the liquid coating shall spread over the entire substrate surface presented to it. However, many liquid polar coating compositions are prone to the defects known as "cissing" and "cratering", which can mar an otherwise level and uniformly thick film. These terms are described in, for example, "Paint Film Defects, Their Causes and Cure", by Manfred Hess, Chapman and Hall Ltd., London (1958). "Cissing" refers to the partial creeping back of a liquid film upon itself exposing islands or border areas of bare substrate and "cratering" refers to the formation within the film of concave, crater-like depressions which may extend through to the substrate to form a "pin-hole" in the film.

We have now found that these defects, when present in a polar liquid coating composition, can often be alleviated or cured by incorporating in the liquid a self-stabilising dispersion of an amphipathic polymeric material as hereinunder defined.

Accordingly, we now provide a process of modifying the levelling characteristics of a film of a polar liquid coating composition on a solid substrate by incorporating in the coating composition 0.5-60.0% by weight of an amphipathic random copolymer of α, β-ethylenically unsaturated monomer comprising;
(1) 5-50% by weight of monomer (a), which is monomer having a chain-like molecular structure with a chain-length of at least 80 covalently bonded atoms and which is soluble in poly(ethylene oxide) of molecular weight 400,
(2) 25-95% by weight of monomer (b), which is insoluble in poly(ethylene oxide) of molecular weight 400 and has the structure

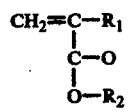

wherein
$R_1$ is H or $CH_3$ and
$R_2$ is a chain-like moiety of chain length at least 10 covalently bonded atoms, (3) monomer (a) plus monomer (b) to the extent of at least 60% by weight of the total unsaturated monomer, and
(4) monomer (a) and monomer (b) in the ratio by weight of from 1 : 19 to and including 1 : 1;
and further characterised in that the said amphipathic random copolymer forms a self-stabilising dispersion in poly(ethylene oxide) of molecular weight 400.

We further provide a film on a solid substrate of a polar liquid coating composition comprising 0.5-60.0% by weight of an amphipathic random copolymer of α, β-ethylenically unsaturated monomer comprising;
(1) 5-50% by weight of monomer (a), which is monomer having a chain-like molecular structure with a chain-length of at least 80 covalently bonded atoms and which is soluble in poly(ethylene oxide) of molecular weight 400,
(2) 25-95% by weight of monomer (b), which is insoluble in poly(ethylene oxide) of molecular weight 400 and has the structure

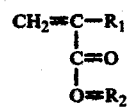

wherein
$R_1$ is H or $CH_3$ and
$R_2$ is a chain-like moiety of chain length at least 10 covalently bonded atoms,
(3) monomer (a) plus monomer (b) to the extent of at least 60% by weight of the total unsaturated monomer, and
(4) monomer (a) and monomer (b) in the ratio by weight of from 1 : 19 to and including 1 : 1;
and further characterised in that the said amphipathic random copolymer forms a self-stabilising dispersion in poly(ethylene oxide) of molecular weight 400.

The term "liquid coating composition" is used throughout this specification in its commonly accepted sense of meaning a liquid which provides or is capable of providing a solid adherent protective or decorative coating film on a solid substrate. It is known in the art that such liquids must comprise components which are polymeric or are capable of being converted to polymeric products. Such components are commonly referred to as the film-forming components.

This invention is, however, applicable specifically to polar liquid coating compositions. The term 'polar' is generally understood to apply to a material which has a significant polarity due to the presence in its molecular structure of atoms other than carbon and hydrogen. Common usage further refines the meaning in a somewhat arbitrary manner to refer to some materials as strongly polar and others as only moderately or weakly polar. Thus, for example, liquids such as ethyl acetate, methyl ethyl ketone, ethylene glycol, poly(ethylene glycol) and water have been referred to as highly polar materials while lauryl alcohol and octyl acetate, for example, are considered to be weakly polar. Such generalities are not sufficiently precise to define polar liquids for the purpose of this invention.

In general, liquids of like polarity are to some extent mutually compatible and we have found that, provided a liquid coating composition is compatible to the extent of at least 20% by weight with poly(ethylene oxide) of molecular weight 400 at the temperature at which the desired levelling characteristics are to be displayed, it is sufficiently polar to meet the requirements of our invention for a polar liquid. The polar liquid need not, of course, be a single component. It may be a mixture of liquids or a solution in a liquid of another material, for example a polymeric solid, provided the liquid as a whole has the required prescribed compatibility with poly(ethylene oxide). We accept the test liquid and poly(ethylene oxide) as being compatible if, at the specified concentration and temperature, a mixture of the two liquids having once been blended together, with agitation if necessary, forms a single phase and shows no visual signs of phase separation on standing for 1 hour.

Thus, the polar liquid coating composition may be a solution of a film-forming polymeric material in a suitable organic liquid, e.g. a solution of an ester diol oligomer as described in U.K. patent specification Nos. 1,345,907 or 1,371,755, in a polar liquid.

The polar liquid coating composition may be, in another embodiment, a solution of an unsaturated polyester resin in an $\alpha, \beta$-ethylenically unsaturated monomer. As another alternative, it may be a dispersion in water of particles of film-forming polymer; that is it may be a latex of e.g. an acrylic or vinyl acetate polymer or copolymer.

The choice of polar liquid coating composition is not limited to materials which are mobile liquids at ambient temperature. For example, the coating composition may be a polymer which is at a temperature above its melt temperature and which was initially deposited in powder form on the substrate. That is, the liquid may be a so-called "powder coating", liquified by heat during a coating process.

The formulation of polar liquid coating compositions as illustrated by the foregoing examples is well-documented in the art and is not critical to the present disclosures. Optionally they may contain ancillary materials such as, for example, curing agents, anti-oxidants, fillers, pigments and preservatives dissolved or dispersed therein, provided due regard is paid to the effect such materials may have on the polarity of the liquid.

As explained hereinabove, the amphipathic copolymers used in our invention have the structure of random copolymers of $\alpha, \beta$-ethylenically unsaturated monomers. They may, in fact, be made by the copolymerisation of the appropriate comonomers using conventional free radical initiators for example organic peroxides, hydroperoxides and azo-bis-nitriles. Alternatively, they may be prepared from comonomers which yield intermediate copolymeric products convertible in situ to the required final structure.

Monomer (a), as defined hereinabove, is a chain-like ethylenically unsaturated monomer which is soluble in poly(ethyleneoxide) of molecular weight 400. Bearing in mind that the degree to which a molecule or molecule segment is solvated by a particular liquid depends on its polarity relative to that of the liquid, this means that a suitable monomer (a) will consist of a chain-like polar moiety soluble per se in the poly(ethylene oxide), the chain-like moiety being terminated by a pair of carbon atoms which provide the ethylenic unsaturation.

Thus, suitable monomer (a) is provided by, for example, methoxy poly(ethylene oxide) acrylate or methacrylate and monomer prepared by reacting the carboxyl groups of a copolymer of methyl methacrylate, hydroxy propyl methacrylate and methacrylic acid in the monomer weight proportions of 79/20/1 with glycidyl methacrylate. The monomer (a) may be a mixture of two or more individual monomers.

Monomer (b) is an ester or mixture of esters of acrylic or methacrylic acid and it must be insoluble in poly(ethylene oxide) of molecular weight 400. As a further requirement, the moiety $R_2$ must be a chain-like segment of the monomer molecule with a chain-length of at least 10 covalently linked atoms. These requirements are met if, for example, $R_2$ is an aliphatic hydrocarbon chain with a chain-length of at least 10 covalently bonded carbon atoms. Provided the molecule as a whole is insoluble in the specified poly(ethylene oxide) the moiety $R_2$ need not be entirely composed of hydrogen and carbon atoms. For example, it may contain a hetero-atom such as an oxygen atom of an ester carboxyl group or a hydroxyl group.

Thus, suitable monomer (b) can be, for example, lauryl methacrylate, stearyl acrylate, stearyl methacrylate, tridecyl methacrylate and the methacryl ester of a self-polyester of 12-hydroxy stearic acid.

The amphipathic random copolymer may comprise monomer of type (a) and type (b) alone. Alternatively, portion of the molecule may be $\alpha, \beta$-ethylenically unsaturated monomer which is not of either of these types, but which is co-polymerisable with them. For example, other acceptable comonomers are butyl acrylate, ethyl hexyl acrylate, butyl methacrylate, styrene and 'vinyl toluene'.

Monomer containing specific chemically reactive groups may also be used, these groups being included to provide, for example, subsequent chemical reactivity with other components with which the polar liquid may be blended. Monomers of this type are, for example, acrylic acid, methacrylic acid, acrylamide, methacrylamide, hydroxy propyl methacrylate, glycidyl methacrylate and allyl methacrylate. However, for the performance of this invention it is essential that at least 60% by weight of the total monomer be of monomer (a) plus monomer (b) and that the random copolymer so-derived shall form a self-stabilising dispersion on poly(ethylene glycol) of molecular weight 400. In general we find that the useful level of monomer comprising reactive group present. For example, the maximum useful concentration of carboxy monomer is of the order of 10%, amide monomer 25% and hydroxyl monomer 40% of the total unsaturated monomer comprising the copolymer.

The precise way in which these amphipathic polymers influence cissing and sagging properties is not clear to us, but it does appear to be associated with the need to maintain strict control over the selection of monomer (a) and monomer (b) in the polymer. Without prejudice to the nature of our invention, it appears to us that in order to function in the required manner, the amphipathic polymer must exist in the polar liquid coating composition in a self-stabilising micellar or disperse state and that this configuration is responsive to controls over the monomer (a) and monomer (b) concentrations. We have found that it is more convenient, and in conformity with the observed effects in polar liquid coating compositions, to carry out the test for self-dispersing properties in poly(ethylene oxide) of molecular weight 400 rather than in the coating itself. The condition of self-stabilisation is satisfied if the amphipathic copolymer does not form an optically clear solution in the poly(ethylene oxide) but imparts to it a persistent visible haze or milkiness. A typical 10% by weight dispersion prepared by vigorously shaking the copolymer with the poly(ethylene oxide) appears as an opalescent, slightly viscous fluid.

If the concentration of monomer (a) is too high or the concentration of monomer (b) is too low, the polymer appears to pass into solution in the polar liquid coating composition and the advantages of the invention are lost. If the chain-length of monomer (a) is too short, the concentration of monomer (a) is too low or the concentration of monomer (b) is too high, the polymer forms a coarse, usually unstable dispersion of incompatible particles in the polar liquid coating composition, with no useful effect on its cissing or sagging properties. If the moiety $R_2$ of monomer (b) is of too short a chain-length, the polymer again appears to pass into solution in the polar liquid coating composition and the advantage of the invention is lost.

The amphipathic polymer may be incorporated directly into the polar liquid coating composition at a concentration determined by trial, by stirring it in.

Our invention is especially valuable in its application to high-solids paints, that is paints which have non-volatile contents of at least 70% by weight. In particular, since the amphipathic polymer itself is non-volatile as understood in the context of paint compositions, it represents a novel and useful way of controlling the flow of very high non-volatile content paints, e.g. paints with a non-volatile content of up to 95% by weight. The non-volatile film-forming components of such paints must be inherently of low viscosity at application shear rates to admit of their being handled by established techniques. In our experience, such materials show excessive flow, which is seen as sagging and excessive run-off from vertical substrate surfaces, after application. This cannot be satisfactorily overcome by the conventional ploys of increasing the intrinsic viscosity of the film-forming component of the paint, or by dissolving in it a soluble high-viscosity polymer. This would involve an unacceptable viscosity increase and attendant application difficulties. We have, however, found that sagging can be overcome or mitigated by the addition thereto of our amphipathic polymer as hereinabove defined, typically at concentrations of 15–25% by weight, without unduly increasing the viscosity of the coating. The control of levelling deficiencies associated with cissing and cratering is usually affected by much lower concentrations of amphipathic copolymer, typically as low as 0.5–10% by weight.

The invention is illustrated by the following examples in which all parts are given by weight:

EXAMPLE 1

Preparation of an amphipathic copolymer according to the invention which forms a self-stabilising dispersion in poly(ethylene oxide) of molecular weight 400. In this example, monomer (a) comprised 11% and monomer (b) 68% by weight of the total unsaturated monomer, and the monomer (a): monomer (b) ratio was 1:6.2

A reaction vessel fitted with a heating mantle, stirrer, thermometer and reflux condenser was charged with 60 parts of a mixture of water, n-butanol and ethanol in the weight ratio of 2.5 :2.5 : 1 and heated to 90° C.

The following mixture:

| | | |
|---|---|---|
| lauryl methacrylate | 49.2 | parts |
| methoxy poly(ethylene oxide) methacrylate, mol.wt 2300 | 8.0 | " |
| hydroxypropyl methacrylate | 15.0 | " |
| ethanol | 28.0 | " |

-continued

| | | |
|---|---|---|
| azodiisobutyronitrile | 1.0 | " | was fed into the batch at a uniform rate over a period of 3 hours. After that time, a further mixture of 3 parts of ethanol and 0.14 parts of azodiisobutyronitrile was run into the batch over a 30 minute period, after which a steady reflux was maintained for a further 1 hour. Then, 28 parts of reflux condensate was stripped from the batch.

A creamy dispersion of an amphipathic random copolymer was formed.

A sample of the dispersion was evaporated to constant weight in an air oven at 105° C. The viscous paste soformed dispersed on shaking vigorously with poly(ethylene oxide) of molecular weight 400 to form a stable, creamy dispersion of amphipathic random copolymer.

EXAMPLE 2

Preparation of a self-stabilising dispersion of the amphipathic random copolymer of example 1 in a polar liquid comprising a di-hydroxy film-forming component.

The preparation according to example 1 was repeated, save that the water n-butanol and ethanol of example 1 was replaced by 51 parts of bis-hydroxy propyl glutarate and the 28.0 parts of ethanol increased to 42.0 parts. No reflux condensate was stripped from the batch.

A creamy dispersion with a viscosity of about 8 poise at a shear rate of $10^4 \sec^{-1}$ was obtained. The dispersion contained 42% by weight of amphipathic random copolymer.

EXAMPLES 3-4

Preparation of self-stabilising dispersions of amphipathic random copolymers in polar liquids. In example 3, monomer (a) comprises 10% and monomer (b) 85% by weight of the total unsaturated monomer and the monomer (a):monomer (b) ratio was 1:8.5, and in Example 4, monomer (a) comprises 30% and monomer (b) 60% by weight of the total unsaturated monomer and the monomer (a):monomer (b) ratio was 1:2.

These examples were carried out using the method and the materials of example 2, except that the lauryl methacrylate, methoxy poly(ethylene oxide) methacrylate and hydroxypropyl methacrylate were replaced by the following materials and quantities.

| | Example 3 | | Example 4 | |
|---|---|---|---|---|
| lauryl methacrylate | 63.9 | parts | 45.1 | parts |
| poly(ethylene oxide) methacrylate, mol.wt. 2300 | 7.5 | " | 38.5 | " |
| methacrylate acid | 3.7 | " | — | |
| glycidyl methacrylate | — | | 7.5 | " |

The result in each case was a creamy dispersion containing about 42% by weight of amphipathic random copolymer.

EXAMPLE 5

Effect of an amphipathic random copolymer as hereinabove defined on the levelling properties of a polar liquid coating composition.

The coating composition used in this example is a combination of a diol (bis-hydroxy propyl glutarate) and a cross-linking agent (hexamethoxy methylmelamine) which, when stoved with the diol in the presence of a catalyst, produces a thermoset paint coating.

The amphipathic random copolymer tested was that from example 2.

A series of polar liquid paint compositions was prepared according to the following table, by mixing the ingredients shown in the specified quantities. In all cases, the paints were catalysed by adding to them 10% by wt. of a 10% solution by weight in ethanol of p-toluene sulphonic acid.

The paints so-prepared were examined for cissing tendencies by observing their behaviour when they were applied as wet films of about 50 micrometer thickness to clean tin-plate panels. The results were observed visually and rated on an arbitrary scale of 0–10 where zero corresponds to no cissing and 10 to very severe cissing.

The degree of sag of the samples was determined by applying wet films of the paint at about 50 micrometer thickness to clean glass panels, sprinkling a line of insoluble pigment particles across the films, standing the panels in a vertical position with the line of pigment horizontal for 35 minutes at 130° C and measuring vertical movement of the line of pigment. In general, a displacement of more than 15 millimeters under these test conditions was judged to be evidence of excessive sag.

The results were as follows:

| Paint Composition (parts) | | | | |
|---|---|---|---|---|
| Diol | Cross-linking agent | Amphipathic copolymer | Sag in millimeters | Cissing |
| 77 | 23 | 0 | 56 | 10 |
| 76.5 | 23 | 0.5 | 50 | 2 |
| 67 | 23 | 10 | 34 | 0 |
| 57 | 23 | 20 | 18 | 0 |
| 47 | 23 | 30 | 13 | 0 |
| 37 | 23 | 40 | 5 | 0 |
| 27 | 23 | 50 | 2 | 0 |

It can be seen that a small addition of amphipathic random copolymer overcame the severe cissing exhibited by the untreated paint.

A progressive improvement in sag resistance was evident as the concentration of amphipathic random copolymer increased in the paint.

EXAMPLE 6

Levelling control of a powder coating. The powder coating is converted to a polar liquid coating composition during the coating process, by subjecting it to a temperature above its flow point.

To 95 parts of a commercial epoxy resin derived from epichlorhydrin and bis-phenol A (epoxide equivalent approx. 1000 and average molecular wt 1400) was added 5 parts of amphipathic copolymer paste from example 1 and the mixture milled to a fine, homogeneous powder.

A coating of the powder so-prepared was dusted onto a clean tin-plate panel, which was held horizontal and warmed until the powder melted and flowed to a coating film on the panel.

A similar procedure was followed with the same epoxy powder but omitting the addition of amphipathic copolymer.

On inspection of each panel after they had cooled to room temperature, it was observed that the film containing the copolymer was evenly distributed over the tin-plate panel, while the other film showed marked areas of cissing.

EXAMPLE 7

Effect of substituting other monomers for the monomer (b) of example 2 on the sagging and cissing of a polar liquid coating composition.

A series of amphipathic random copolymers was prepared by the general method of example 2 but replacing the lauryl methacrylate of that example by equal weights of the monomers shown hereunder. The copolymers were examined by the method of example 3 for their effects on the cissing properties of a polar liquid coating composition using a constant diol/cross-linking agent/amphipathic copolymer weight ratio of 47/23/30.

The results were as follows:

| Monomer | Chain-length $R_2$ | Sag in millimeters | Cissing |
|---|---|---|---|
| Stearyl methacrylate | 18 | 7 | 1 |
| Tridecyl methacrylate | 13 | 12 | 0 |
| Lauryl methacrylate | 12 | 13 | 0 |
| Styrene | cyclic | 10 | 8 |
| Control (no amphipathic copolymer) | — | 56 | 10 |

The control sample in which no amphipathic copolymer was used, showed severe sagging and cissing under the test conditions. Sagging was acceptable when styrene was substituted for the lauryl methacrylate of example 2, but cissing was poor. The remaining monomers, all of which conform to our definition of monomer (b), gave good control of sagging and virtually eliminated cissing.

EXAMPLE 8

Effect of variation in chain-length of the methoxy poly(ethylene oxide) used as monomer (a), as hereinabove defined, of example 2, on the levelling of a polar liquid coating composition.

A series of amphipathic random copolymers was prepared by the general method of example 2 but varying the chain-length of the methoxy poly(ethylene oxide) methacrylate component as shown in the following table. The polymers so-prepared were incorporated in polar liquid coating compositions by the method described in example 3 and at a constant diol/cross-linking agent/amphipathic copolymer weight ratio of 47/23/30.

When tested for sagging and cissing tendencies by the general method of example 3, it was seen that all compositions according to the invention showed an acceptable sag resistance and freedom from cissing. The composition in which the poly(ethylene oxide) chainlength of the amphipathic copolymer was less than 80 covalent bonds in length showed excessive sagging.

| Sample No. | Poly(ethylene oxide) chain length | Sag in millimeters | Cissing |
|---|---|---|---|
| 1 | 67 | (composition incompatible) | |
| 2 | 81 | less than 15 | 0 |
| 3 | 124 | " | 0 |
| 4 | 167 | " | 0 |
| 5 | 289 | " | 0 |

Each solid paste was shaken vigorously with poly(ethylene oxide) of molecular weight 400. The copolymers as used in samples 2, 3, 4 and 5 of this example dispersed to give stable, hazy dispersions. The copolymer of sample 1 was incompatible with the poly(ethylene oxide).

EXAMPLE 9

The effect of varying the monomer (a) monomer (b) ratio as hereinabove defined on some properties of a polar non-aqueous liquid coating composition.

A series of amphiphatic random copolymers was prepared by the general method of example 2 but varying the ratio of monomer (a) to monomer (b) as shown in the following table. The monomers comprising the copolymer were methoxy poly(ethylene oxide) methacrylate of molecular weight 2300 (type a), lauryl methacrylate (type b) and hydroxy propyl methacrylate (21% by weight of total monomers). The polymers so-prepared were evaluated in a polar non-aqueous liquid coating composition by the general methods described in example 3 at a constant diol cross-linking agent amphipathic copolymer weight ratio of 47/23/30, with this following results, estimated visually:

| Ratio Monomers (a)/(b) | Appearance of amphipathic copolymer | Sag Resist | Cissing Control |
|---|---|---|---|
| 1 : 17.2 | V. Fine dispersion | V. Good | Good |
| 1 : 8.1 | Fine, stable dispersion | Good | V. Good |
| 1 : 3.5 | " | Good | V. Good |
| 1 : 1.5 | V. Fine dispersion | V. Good | Fair |
| 1 : 0.5 | Clear solution | Good | Poor |
| 1 : 0.3 | " | Good | Poor |

Samples of each of the amphipathic copolymers were checked for their dispersibility in poly(ethylene oxide) of molecular weight 400. The first four samples, which provided compositions according to the invention in this example, formed self-stabilised dispersions therein. The two comparative examples were soluble in the poly (ethylene oxide). Only the compositions according to the invention provided both adequate sag resistance and acceptable cissing control.

EXAMPLE 10

Control of cissing according to the invention in a polar liquid coating composition comprising a thermosetting aqueous latex.

The amphipathic random copolymer used was the dispersion of example 1.

To 90 parts of a commercial aqueous thermosettable latex coating composition wherein the cross-linking agent is blended with the disperse phase (AC 658 supplied by Rohm and Haas, U.S.A.) were added 10 parts of the above-prepared amphipathic copolymer, 1.9 parts of 2-butoxy ethanol and 0.1 parts of a commercial anti-foam agent. A liquid coating film on a tin-plate substrate was prepared from this composition and examined for cissing resistance, as described in example 3, and was given a rating of 0. In the absence of the amphiphatic copolymer the same coating was found to have a cissing rating of 8, thus demonstrating the beneficial effect of this invention in up-grading resistance to cissing of an aqueous polar composition.

The above non-pigmented polar liquid coating composition was pigmented by dispersing therein titanium dioxide pigment to a pigment binder ratio of 70 : 100. When applied to aluminum coil by a reverse roller coater, the liquid film so-applied showed exceptional levelling, being free of cissing and sagging defects.

EXAMPLE 11

Preparation of an amphipathic copolymer which forms a self-stabilising dispersion in poly(ethylene oxide) of molecular weight 400. The monomer (a), as hereinabove defined, comprises a side-chain of poly(methyl methacrylate/hydroxy propyl acrylate/acrylic acid)

A reaction vessel fitted with a heating mantle, sitrrer, thermometer and reflux condenser was charged with 156 parts of 2-ethoxyethanol acetate and 43 parts of acetone, then heated to reflux (approx. 87° C).

The following mixture:

| | | |
|---|---|---|
| methyl methacrylate | 138.4 | parts |
| hydroxypropyl acrylate | 33.2 | " |
| acrylic acid | 3.7 | " |
| methacrylic acid | 0.9 | " |
| azo-bis-isobutyronitrile | 2.3 | " |
| tert-dedecyl mercaptan | 5.2 | " | was fed into the refluxing batch at a uniform rate over a period of 2 hours. A mixture of methyl ethyl ketone 16 parts, and azo-bis-isobutyronitrile 0.9 parts, was added in like monomer over a period of 1 hour, at a reflux temperature of approx. 92° C.

Reflux condensate was then stripped off until the reflux temperature rose to 135°–140° C, when the batch was cooled to 105° C.

At that stage, successive additions of glycidyl methacrylate 12.5 parts, amine esterification catalyst* 0.5 parts and hydroquinone 0.2 parts were made and refluxing continued to an acid value of approx. 1 mgm KOH per gm. A solution of a chain-like $\alpha, \beta$-ethylenically unsaturated monomer comprising a poly(acrylate/methacrylate) chain with a chain-length exceeding 80 covalently bonded atoms was formed. The monomer was soluble in poly(ethylene oxide) of molecular weight 400

*Choice of esterification catalyst is not critical. Actual one used was the proprietary product "Armeen" DMCD (Armeen is a trade mark)

An amphipathic random copolymer was prepared from the above unsaturated monomer by the general method of example 2 in which 13 parts (on a solids basis) of the unsaturated monomer of this example were substituted for 8 parts of the methoxy poly(ethylene oxide) methacrylate of example 2. A creamy self-stabilised dispersion of amphipathic random copolymer in a polar liquid was formed. The random amphipathic copolymer was compatible with poly(ethylene oxide) of molecular weight 400.

A polar liquid coating composition was prepared and tested by the general method of example 3, using diol, cross-linking agent and the amphipathic copolymer of this example in the weight proportions of 47/23/30 respectively in preparing the coating composition.

The absence of cissing and a sag of only 12 mm confirmed the effectiveness of the process of our invention.

We claim:
1. A process of modifying the levelling characteristics of a film of a polar liquid coating composition on a solid substrate, characterised in that there is incorporated in the coating composition 0.5–60.0% by weight of an amphipathic random copolymer of $\alpha, \beta$-ethylenically unsaturated monomer comprising;
(1) 5–50% by weight of monomer (a), which is monomer having a chain-like molecular structure with a chain-length of at least 80 covelently bonded atoms and which is soluble in poly(ethylene oxide) of molecular weight 400,

(2) 25–95% by weight of monomer (b), which is insoluble in poly(ethylene oxide) of molecular weight 400 and has the structure

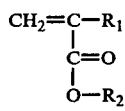

wherein
$R_1$ is H or $CH_3$ and
$R_2$ is a chain-like moiety of chain length at least 10 covalently bonded atoms,
(3) monomer (a) plus monomer (b) to the extent of at least 60% by weight of the total unsaturated monomer, and
(4) monomer (a) and monomer (b) in the ratio by weight of from 1 : 19 to and including 1 : 1; and further characterised in that the said amphiphatic random copolymer forms a self-stabilising dispersion in poly(ethylene oxide) of molecular weight 400.

2. A process of modifying the levelling characteristics of a film of a polar liquid coating composition on a solid substrate according to claim 1, characterised in that the polar liquid coating composition is one member selected from the group consisting of
(a) solutions of at least one at least bifunctional ester which contain as functional groups predominantly hydroxyl groups and optionally carboxyl groups, the ester or esters having an average molecular weight of less than 600,
(b) solutions of unsaturated polyester resins in α, β ethylenically unsaturated monomers,
(c) dispersions in water of particles of film-forming polymers and
(d) liquefied powder coatings.

3. A process of modifying the levelling characteristics of a film of a polar liquid coating composition on a solid substrate according to claim 1, characterised in that monomer (a) is at least one monomer selected from the group consisting of methoxy poly(ethylene oxide) acrylate, methoxy poly(ethylene oxide) methacrylate and the reaction product of a copolymer of methyl methacrylate, hydroxypropyl methacrylate and methacrylic acid in the weight proportions of 79:20:1 with glycidyl methacrylate.

4. A process of modifying the levelling characteristics of a film of a polar liquid coating composition on a solid substrate according to claim 1, characterised in that monomer (b) is at least one monomer selected from the group consisting of the esters of acrylic and methacrylic acid with lauryl, stearyl and tridecyl alcohols and the methacryl ester of a self-polyester of 12-hydroxystearic acid.

5. A process of modifying the levelling characteristics of a film of a polar liquid coating composition on a solid substrate according to claim 1, characterised in that portion of the total unsaturated monomer comprises chemically reactive groups.

6. A film on a solid substrate of a polar liquid coating composition, characterised in that the coating composition comprises 0.5–60.0% by weight of an amphiphatic random copolymer of α, β-ethylenically unsaturated monomer comprising;
(1) 5–50% by weight of monomer (a), which is monomer having a chain-like molecular structure with a chain-length of at least 80 covalently bonded atoms and which is soluble in poly(ethylene oxide) of molecular weight 400,
(2) 25–95% by weight of monomer (b), which is insoluble in poly(ethylene oxide) of molecular weight 400 and has the structure

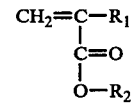

wherein
$R_1$ is H or $CH_3$ and
$R_2$ is a chain-like moiety of chain length at least 10 covalently bonded atoms,
(3) monomer (a) plus monomer (b) to the extent of at least 60% by weight of the total unsaturated monomer, and
(4) monomer (a) and monomer (b) in the ratio by weight of from 1:19 to and including 1:1; and further characterised in that the said amphipathic random copolymer forms a self-stabilising dispersion in poly(ethylene oxide) of molecular weight 400.

7. A film on a solid substrate of a polar liquid coating composition according to claim 6, characterised in that the polar liquid coating composition is selected from the group consisting of
(a) solutions of at least one at least bifunctional ester which contain as functional groups predominantly hydroxyl groups and optionally carboxyl groups, the ester or esters having an average molecular weight of less than 600,
(b) solutions of unsaturated polyester resins in α, β-ethylenically unsaturated monomers,
(c) dispersions in water of particles of film-forming polymers and
(d) liquefied powder coatings.

8. A film on a solid substrate of a polar liquid coating composition according to claim 6, characterised in that monomer (a) is one or more monomers selected from the group consisting of methoxy poly(ethylene oxide) acrylate, methoxy poly(ethylene oxide) methacrylate, and the reaction product of a copolymer of methyl methacrylate, hydroxypropyl methacrylate and methacrylic acid in the weight proportions of 79:20:1 with glycidyl methacrylate.

9. A film on a solid substrate of a polar liquid coating composition according to claim 6, characterised in that monomer (b) is one or more monomers selected from the group consisting of the esters of acrylic and methacrylic acid with lauryl, stearyl and tridecyl alcohols and the methacryl ester of a self-polyester of 12-hydroxystearic acid.

10. A film on a solid substrate of a polar liquid coating composition according to claim 6, characterised in that a portion of the total unsaturated monomer comprises chemically reactive groups.

* * * * *